July 5, 1932.  W. G. HUNTON  1,866,306
INSTRUMENT FOR VIEWING DESIGNS IN MULTIPLE
Filed Sept. 13, 1929    2 Sheets-Sheet 1

Inventor:
William Gordon Hunton,
By Alfred ___
Atty.

July 5, 1932. W. G. HUNTON 1,866,306
INSTRUMENT FOR VIEWING DESIGNS IN MULTIPLE
Filed Sept. 13, 1929   2 Sheets-Sheet 2

Inventor:
William Gordon Hunton
By Alfred Lee
Atty.

Patented July 5, 1932

1,866,306

UNITED STATES PATENT OFFICE

WILLIAM GORDON HUNTON, OF GREAT MISSENDEN, ENGLAND

INSTRUMENT FOR VIEWING DESIGNS IN MULTIPLE

Application filed September 13, 1929, Serial No. 392,330, and in Great Britain July 30, 1929.

When designing ornamental objects which have a particular design repeated thereon, the designer usually produces a sketch of a single design either full size or on a larger scale than that required but it is not easy to appreciate therefrom the aspect of a compound design formed by a number of said single designs when reduced and repeated.

One object of the present invention is to provide an instrument whereby the aspect which will be produced by the repetition of a design when reduced can be readily ascertained from the original without the necessity of reducing it to the required size and reproducing it by a photographic or mechanical process which is a somewhat expensive procedure.

With this purpose in view, there is provided according to the invention an instrument comprising a plurality of optical image-forming devices for producing reduced images of an object when viewed at a suitable distance by the aid of said devices.

Any suitable image-forming devices may be employed, but identical reducing lenses arranged side by side are preferred.

Means may also be provided to permit relative adjustment between two or more of said optical image-forming devices.

Instruments according to this invention are primarily intended for the use of designers or manufacturers of wall-coverings or decorations to enable them to ascertain from a single design drawn to a large scale, the aspect which will be produced by a compound design wherein said single design is repeated on a small scale, but the invention is useful in other arts, for instance in designing figured dress materials, cretonnes, tapestries, floor-coverings, or whenever a single design is to be repeated.

For a more complete understanding of the invention, several embodiments thereof will now be described, by way of examples, with reference to the accompanying drawings, in which—

Figure 1:
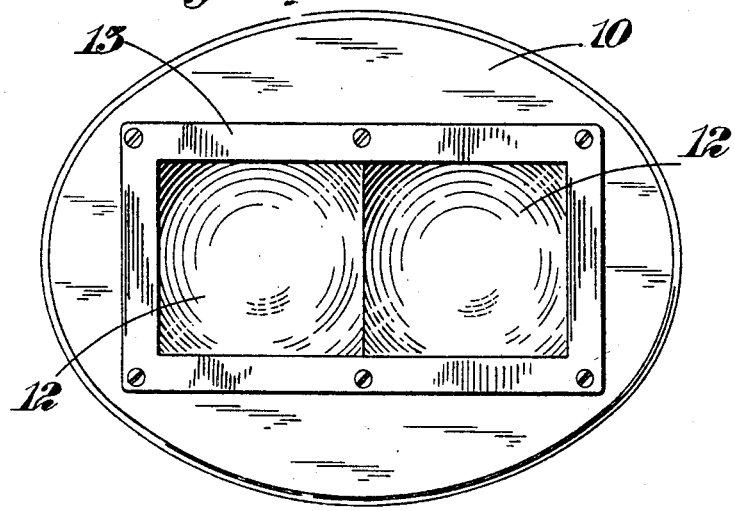
Figure 2:
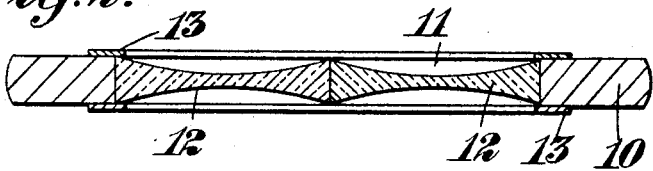
Figure 3:
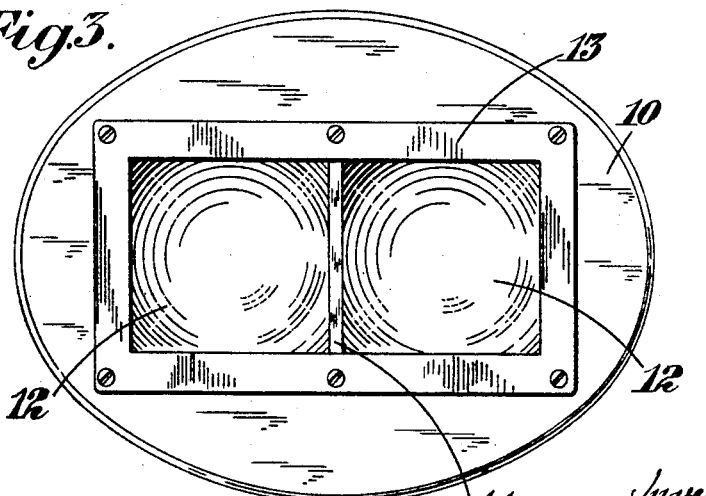
Figure 4:
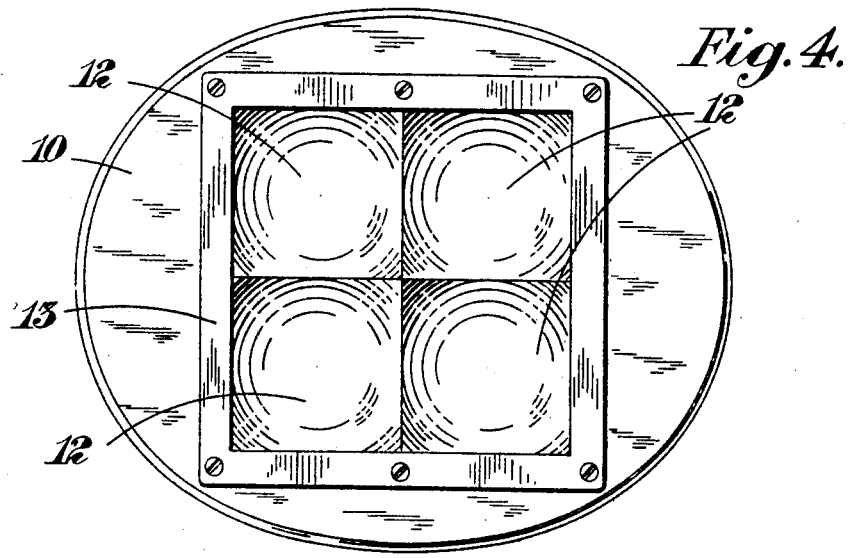
Figure 5:
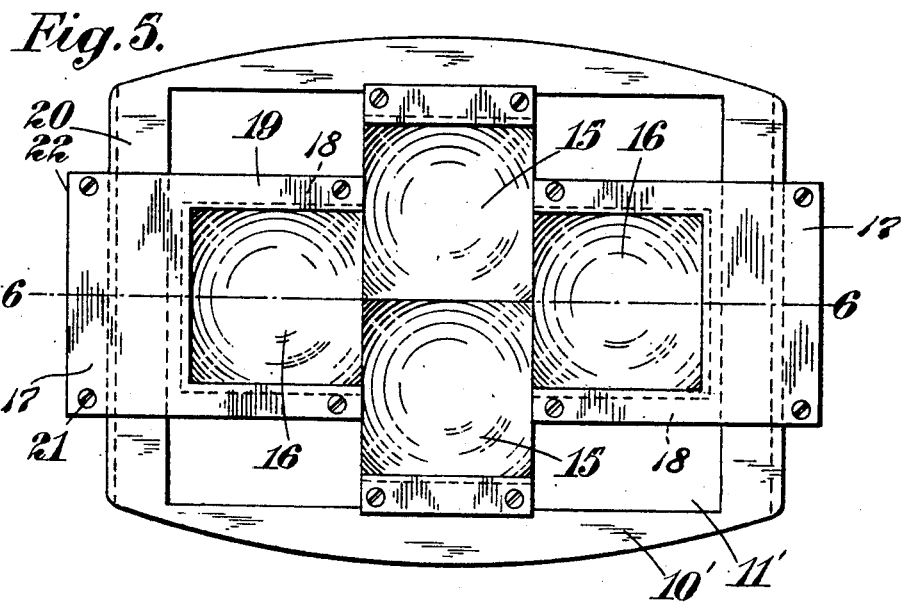
Figure 6:
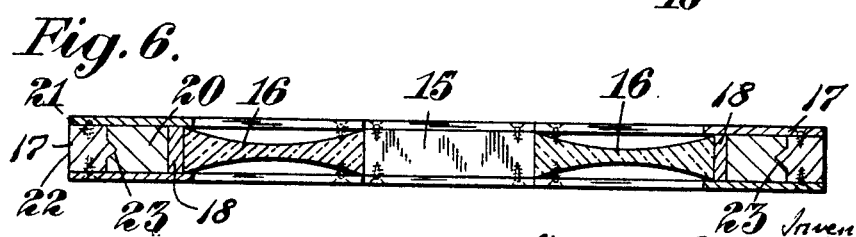

Figure 1 is a plan of one construction,
Figure 2 is a longitudinal section thereof,
Figure 3 is a plan of a modification,
Figure 4 is a similar view of another modification,
Figure 5 is a plan of an instrument in which two of the image-forming devices are adjustably mounted, and
Figure 6 is a section on the line 6—6 of Figure 5.

Like reference numerals indicate similar parts in the various figures of the drawings.

In the construction shown in Figures 1 and 2, the instrument comprises an oval-shaped flat base-member 10 made of wood having a rectangular opening 11 in it. Within said opening two identical double concave lenses 12 are mounted side by side, and to each side of the base-member 10 there is screwed a thin metal frame 13 which overlaps the edges of the opening 11. The metal frames 13 serve to prevent the lenses from falling out should they become loose and also to enhance the appearance of the instrument.

It is not essential that the lenses or other image-forming devices shall adjoin one another as shown in Figures 1 and 2. If desired, they may be separated by a partition 14 as shown in Figure 3.

In the construction shown in Figure 4, four lenses 12 are provided arranged in the form of a square, thus giving four identical images of the single design viewed thereby.

Figures 5 and 6 show a construction comprising four double concave lenses, whereof two are adjustably mounted so that the images produced thereby can be adjusted relatively to the images produced by the other two lenses. In this construction the two stationary lenses 15 are mounted within the opening 11' in the base-member 10' and the adjustable lenses 16 are each mounted in a carrier 17 which is slidably mounted on the base-member 10'. Each lens 16 is cemented to a U-shaped frame member 18 which has secured to it on each side a metal plate 19 which extends across the end wall 20 of the base-member and is secured by screws 21, to a slider 22 mounted to slide in a groove 23 in the outer face of said end wall.

By means of an instrument according to this invention, it is possible by viewing a single design at an appropriate distance to obtain distinct images of said design, either spaced apart or adjoining one another so as to form a continuous pattern or ornament composed of a plurality of the single designs.

It is to be understood that any image-forming devices which will give reduced images when the object is viewed from an appropriate distance may be employed, for instance, said devices may be concave lenses, or combinations of lenses cemented together to form achromatic lenses or even mirrors, but the latter are not so convenient for use as lenses.

Obviously, other constructions than those specifically herein described and illustrated in the drawings may be provided and such other constructions are intended to lie within the scope of the invention.

I claim:—

1. A self-contained pocket instrument for the purpose set forth, comprising a substantially flat base-member having an opening therein, a plurality of double concave lenses mounted within said opening, and a metal frame secured to said base-member overlapping the edges of said opening.

2. A pocket instrument for viewing a design in multiple comprising a frame to be held between the eye and a design, and a plurality of reducing lenses carried by said frame to form for the eye repetitions of the design.

3. A pocket instrument for viewing a design in multiple comprising a frame to be held between the eye and a design, a plurality of reducing lenses carried by said frame in side to side relation to form for the eye repetitions of the design, and means mounting at least one of said lenses within said frame for adjustment in the plane thereof relative to the other lens or lenses.

4. A pocket instrument for viewing a design in multiple comprising a frame to be held between the eye and a design, a reducing lens fixed within said frame, a lens carrier slidably mounted on said frame, and a reducing lens mounted in said lens carrier.

5. A pocket instrument for viewing a design in multiple comprising a frame to be held between the eye and a design, a plurality of reducing lenses disposed in a row in a common plane within said frame and fixed thereto, and a reducing lens disposed in the same plane as said row of fixed lenses and mounted for adjustment in the plane thereof along said row of fixed lenses.

6. A pocket instrument for viewing a design in multiple comprising a frame to be held between the eye and a design, a plurality of reducing lenses disposed in a row in a common plane within said frame and fixed thereto, and at least one reducing lens at each side of said row of fixed lenses mounted in said frame for adjustment in the plane of said row of lenses along said row.

7. A pocket instrument for viewing a design in multiple comprising a frame to be held between the eye and a design, a reducing lens mounted in said frame, a lens carrier embracing a part of said frame and slidably adjustable therealong, and a reducing lens mounted in said lens carrier in the plane of said first mentioned lens.

In testimony whereof I affix my signature.

WILLIAM GORDON HUNTON.